(12) United States Patent
Stolte

(10) Patent No.: US 6,671,038 B2
(45) Date of Patent: Dec. 30, 2003

(54) MEASUREMENT OF POLARIZATION DEPENDENT CHARACTERISTIC OF OPTICAL COMPONENTS

(75) Inventor: Ralf Stolte, Hamburg (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/075,864

(22) Filed: Feb. 13, 2002

(65) Prior Publication Data

US 2002/0196426 A1 Dec. 26, 2002

(30) Foreign Application Priority Data

Jun. 7, 2001 (EP) .............................................. 01113886

(51) Int. Cl.$^7$ .............................................. G01N 21/00
(52) U.S. Cl. ..................................................... 356/73.1
(58) Field of Search ................................ 356/73.1, 124, 356/125; 385/12–14, 24; 250/227.17; 359/118–124, 326, 485, 850

(56) References Cited

U.S. PATENT DOCUMENTS 5,896,193 A * 4/1999 Colbourne et al. .......... 356/124
6,229,606 B1 5/2001 Way et al. .................. 356/364

OTHER PUBLICATIONS

Zafiropoulos, N, Examiner. European Search Report Application No. EP 01 11 3886 dated Dec. 12, 2001.

* cited by examiner

Primary Examiner—Tu T. Nguyen

(57) ABSTRACT

For measuring a polarization dependent parameter of an optical device under test—DUT—, an optical source provides an optical stimulus signal at variable wavelengths, and a polarization translator translates the polarization state of the optical stimulus signal applied from the optical source at its input to its output in a deterministic way dependent on the wavelength of the optical stimulus signal. A receiving unit receives an optical response signal from the DUT to the applied optical stimulus signal, and an analyzing unit analyzes received optical response signals for different wavelengths for determining values of the polarization dependent parameter of the DUT.

12 Claims, 3 Drawing Sheets

MEASUREMENT OF POLARIZATION DEPENDENT CHARACTERISTIC OF OPTICAL COMPONENTS

BACKGROUND OF THE INVENTION

The present invention relates to testing of optical components in particular for communication systems.

Measurement of polarization dependent parameters like polarization dependent loss (PDL) and polarization dependent group delay PDGD (covering Differential Group Delay DGD and Polarization Mode Dispersion PMD) is of increased importance for advanced communication systems and generally described in 'Fiber Optic Test and Measurement' by Dennis Derickson, ISBN 0-13-534330-5, 1998, pages 354ff. Especially long-haul high-speed systems require that polarization properties of its components fulfill certain requirements. In general, component manufacturers address this by 100% testing of components for critical parameters. PDL nowadays in many cases is already measured 100%, PDGD may also develop to be a 100% test in manufacturing.

Today's solutions for measuring polarization dependent loss parameters are the scrambling method (applying a random variation of polarization states and comparing maximum with minimum determined loss) or the Mueller method, whereby 4 defined polarization states are measured for each wavelength point and analyzed together. The latter requires multiple measurement sweeps at predefined polarization states. These methods are either slow, if testing at multiple wavelengths is required (PDL measurement using the scrambling method), or require multiple measurement sweeps at predefined polarization states (Mueller method). Multiple sweeps are disadvantageous because measurement time is increased and require very high stability of the measurement setup because no change of polarization properties of the whole setup (between laser and DUT) is allowed between the sweeps.

SUMMARY OF THE INVENTION

It is an object of the invention to provide an improved measurement of polarization dependent parameters. The object is solved by the independent claims. Preferred embodiments are shown by the dependent claims.

For measuring polarization dependent parameters of an optical device under test (DUT), an optical source (preferably a tunable laser) provides an optical signal through an optical polarization translator to the DUT. The polarization translator translates the polarization of the optical signal from its input to its output in a deterministic way dependent on the wavelength of the optical signal.

The polarization translator provides the translation of the polarization dependent on the wavelength preferably using birefringent properties. Accordingly, the optical source may also provide a variation of the wavelength over the time, and polarization translator provides a variation of the polarization over the time, so that effectively the translator also provides a 'translation' of the polarization dependent on the wavelength. The parameters wavelength and frequency shall be regarded here as equivalents (related by the general equation $f=c/\lambda$).

When varying the wavelength of the optical source, the polarization translator changes the polarization of the signal launched into the DUT. Tuning the wavelength of the optical source in a way that measurement points with different polarization states are covered thus allows determining polarization dependent parameters of the DUT in that particular wavelength range.

Typical polarization dependent parameters that can be analyzed by the invention are polarization dependent loss (PDL) or polarization dependent group delay PDGD (also referred to as Differential Group Delay (DGD) or Polarization Mode Dispersion (PMD)).

The uncertainty of the polarization state of the output signal may be reduced by tapping off some fraction of the signal in an appropriate way and analyzing its polarization state at each wavelength with a polarimeter or a reduced polarization analysis device like an Analyzer.

The polarization translator may be purely passive. The optical signal is preferably provided that it does not hit a Principle State of the Polarization (PSP) of the polarization translator, so that the output signal will follow a trajectory (e.g. a circle) on the Poincare Sphere in a deterministic way.

The same principle of scanning the polarization can be applied to various PMD measurement techniques: For example the Jones Matrix Eigenanalysis (JME) or a novel method which is outlined in the European Patent Application No. 125089.3 (EP 1113250). In case of PMD measurements in general only two polarization states are combined to a measurement value.

In case that several measurement points (defined by the wavelength and the polarization state of the optical signal applied to the DUT) are to be analyzed together for determining a value of a polarization dependent parameter, the wavelength range for those measurement points is preferably selected that a value of the polarization dependent parameter of the DUT can be considered as substantially constant in that wavelength range.

Preferred algorithms for analyzing together several such measurement points are interpolation of neighboring measurement points, combining 4 measurement points using the Mueller Matrix analysis, or combining 2 measurement points using e.g. the Jones Matrix analysis.

The invention has various advantages compared to today's standard methods (polarization scrambling and Mueller Matrix analysis). The polarization transformation device may be purely passive, the number of measurement points can be chosen to be much smaller compared to the scrambling method, and, most important, the complete measurement can be performed within one sweep (instead of four for the Mueller Matrix Analysis). Thus, the invention allows fast measurements and is also less sensitive against e.g. environmental or mechanical disturbances.

The invention can be partly or entirely embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. Features that are substantially or functionally equal or similar will be referred to with the same reference sign(s).

DETAILED DESCRIPTION OF THE INVENTION

Figure 1:
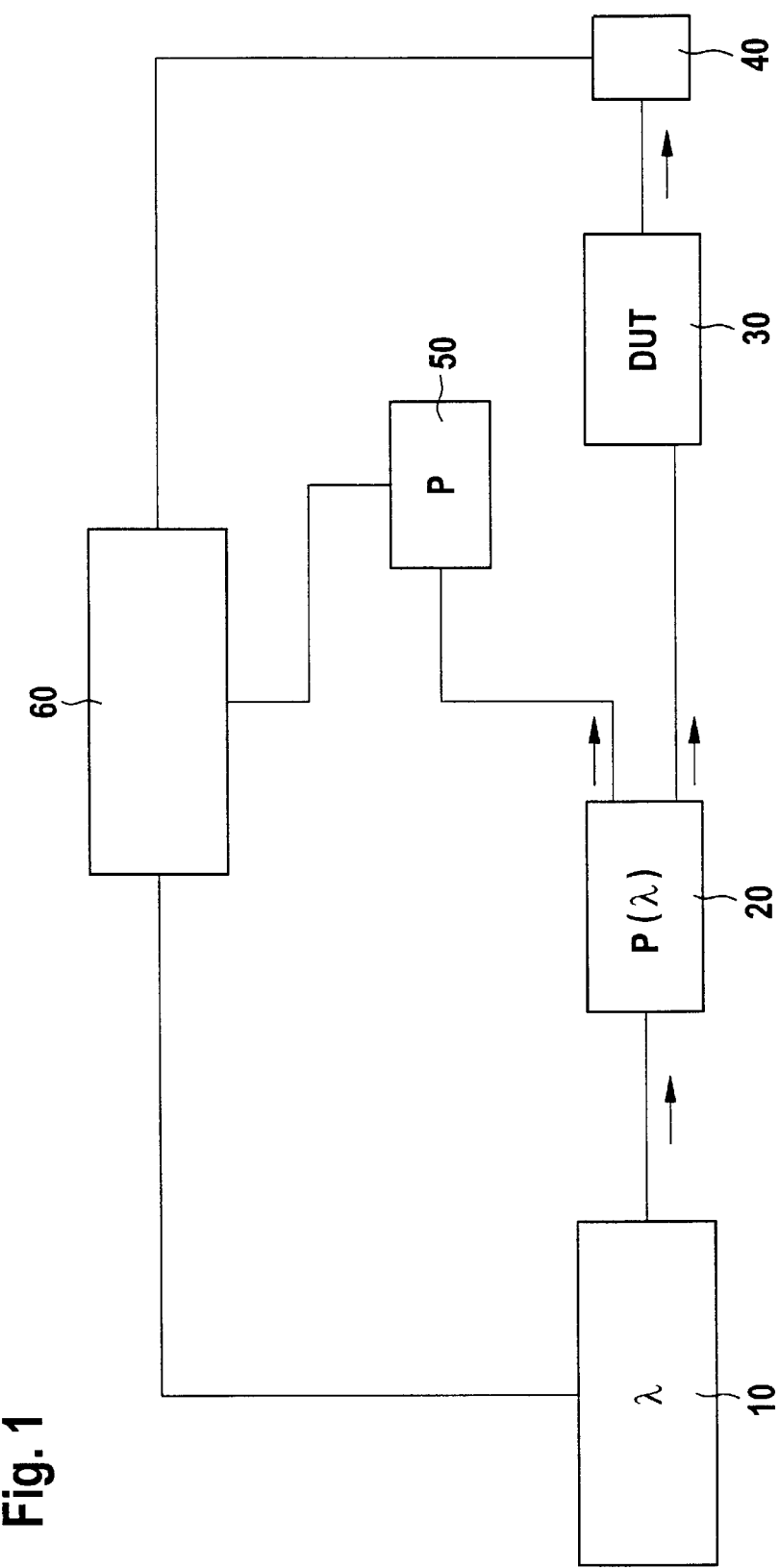
FIG. 1 shows a measurement setup according to the invention for measuring polarization dependent parameters.

In FIG. 1, a tunable laser 10 as an optical source provides an optical signal through an optical polarization translator 20 to an optical device under test (DUT) 30. A power meter 40 receives and detects the optical signal after passing the DUT 30. The polarization translator 20 translates the polarization of the optical signal from its input to its output in a deterministic way dependent on the wavelength of the optical signal.

A polarization analyzer 50 might be optionally coupled to the output of the polarization translator 20 in order to determine the polarization state of the output signal of the polarization translator 20.

A controller 60 is coupled to the power meter 40 for analyzing polarization dependent parameters. Preferably, the controller 60 is further coupled to the tunable laser 10 for controlling the application and variation of the provided an optical signal and to the polarization analyzer 50 for receiving information about the actual polarization state of the output signal from the polarization translator 20.

When varying the wavelength of the tunable laser 10, the polarization translator 20 changes the polarization of the optical signal launched into the DUT 30. In operation, the wavelength of the tunable laser 10 is tuned in a way that optical signals with different polarization states are provided to the DUT 30. For each measuring point (defined by the wavelength and the polarization state of optical signal applied to the DUT 30), the controller 60 receives a value of power intensity determined by the power meter 40. Analyzing the power intensity values for a plurality of different measuring points thus allows determining polarization dependent parameters of the DUT 30 such as polarization dependent loss (PDL).

In a preferred embodiment, several measurement points will be analyzed together for determining a value of a polarization dependent parameter. The wavelength range for those measurement points is selected that a value of the determined polarization dependent parameter of the DUT can be considered as substantially constant in that wavelength range.

Preferably, a set of four measurement points with different polarization states is analyzed together resulting e.g. in one PDL value for the DUT. The wavelength range of the set of measurement points is thereby preferably selected to be smaller than the wavelength resolution for that measurement. In an example wherein PDL measurements are desired with a spectral resolution of 1 pm, a set of measurement points with 4 different polarizations should have a spectral distance of 0.25 pm. Within such wavelength range (even going further up to say 10 pm) it can be seen as sufficiently ensured with typical DUTs of present optical networks that constant PDL properties are maintained in that range.

Figure 2:
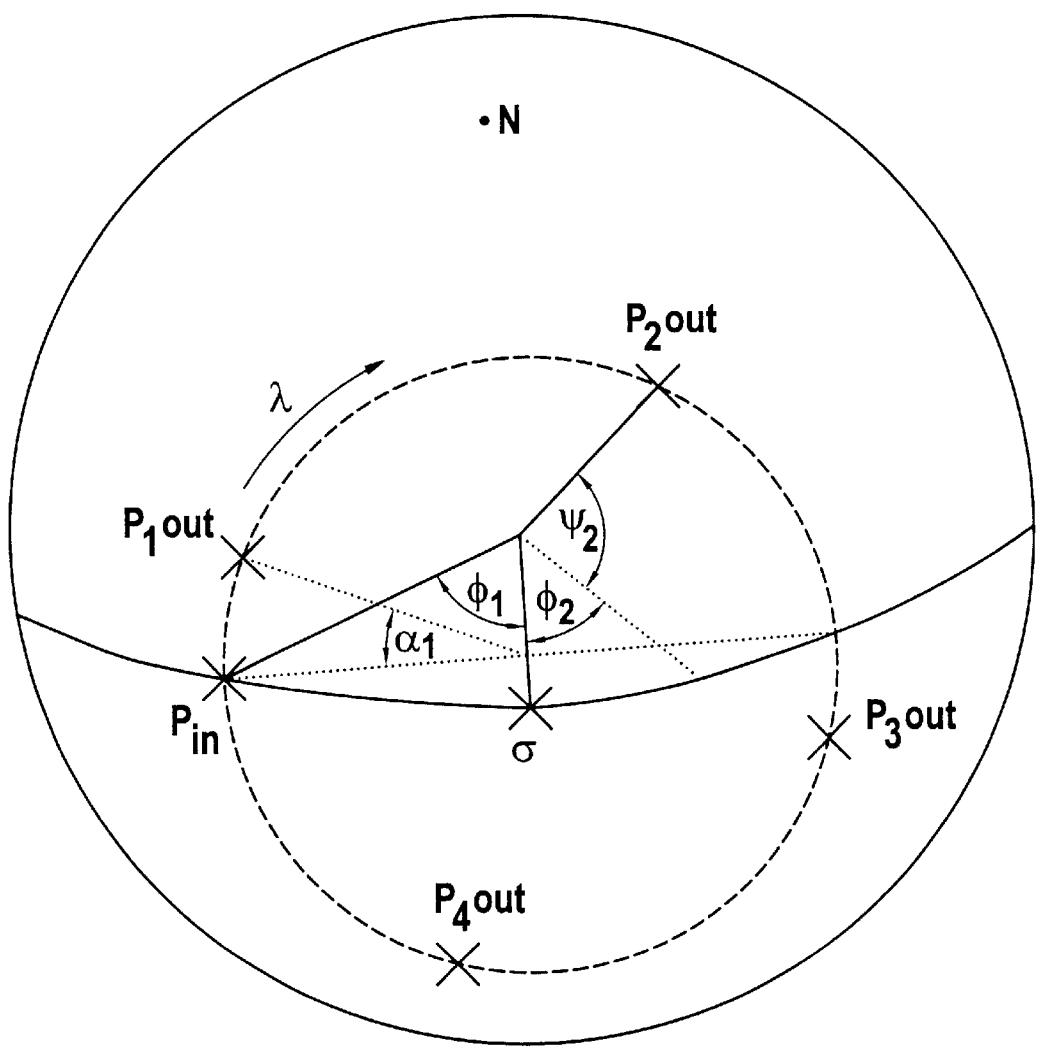
FIG. 2 shows a representation of polarization transformation on Poincare Sphere.

FIG. 2 shows a representation of polarization transformation on Poincare Sphere. The polarization state Pin of the optical signal applied to the polarization translator 20 will be transformed to polarization states $P_i^{out}$ (with i=1, 2, 3, . . . ) at the output of the polarization translator 20. In case of a waveplate (which shows purely linear birefringence) as polarization translator 20 with an orientation O, the polarization states $P_i^{out}$ are all located on a circle on the Poincare Sphere dependent on the wavelength λ of the optical signal.

The polarization translator 20 can be implemented in several ways depending on requirements of the particular measurement to be conducted. If a PDL measurement is to be performed with a Mueller Matrix type of implementation (see for example on pages 356ff in 'Fiber Optic Test and Measurement' by Dennis Derickson, ISBN 0-13-534330-5, 1998), a set of at least four measurements has to be made with polarization states fulfilling certain requirements: they have to be significantly different, must not be located on a great circle of the Poincare Sphere, and preferably should not be located on any circle on the Poincare Sphere. A very high order waveplate that is excited by the linearly polarized signal of the tunable laser 10 can be used. The angle between the polarization of the optical signal and the optical axis of the waveplate is defined to $\phi_1$. However, in this configuration the states of polarization $P_i^{out}$ are located on a circle that under certain circumstances won't allow conducting the Mueller Matrix type of calculation. This problem can be avoided if at least two waveplates are concatenated with their principle state of polarization PSP not aligned. This configuration would provide second order PMD, which means that the trajectory of the polarization translation function on the Poincare sphere won't be a circle anymore.

In contrast to the Mueller Matrix based PDL measurement the PMD measurement techniques mentioned before only require measurement on 2 states of polarization. There are no requirements for these States of Polarization as long as they are sufficiently different.

In a preferred implementation, a high order waveplate as the polarization translator 20 creates a phase difference between the propagating modes by its birefringence. An angle $\alpha_1$ represents the phase difference of the two optical signals propagating in the two Eigenmodes of the waveplate device. When entering the device the phase difference is $\alpha_1=0$. When exiting the angle is given by:

$$\alpha_1 = \frac{2\pi}{\lambda}\Delta n \cdot L \qquad \text{(Equation 1)}$$

with Δn, λ, L representing the difference of the refractive indices of the two propagating polarization modes, the optical wavelength and the length of the device, respectively. If the length L of the birefringent device 20 is kept fixed and dispersive effect are neglected (which means Δn is constant over wavelength), the wavelength increment to increase $\alpha_1$ by a given amount, say $\Delta\alpha_1$ is given by:

$$\Delta\lambda \approx \frac{\Delta\alpha_1 \cdot \lambda^2}{2\pi \cdot \Delta n \cdot L} \qquad \text{(Equation 2)}$$

For example, if PMD measurement values are required with a spectral resolution of 1 nm (as it may be sufficient for fused couplers as DUT 30), measurement values should be taken with an interval of 0.5 nm. From Equation 2, a condition (at λ=1.5 μm) for the polarization transformer 20 can be derived:

$$\Delta n \cdot L \equiv \frac{\Delta\alpha_1 \cdot \lambda^2}{2\pi \cdot \Delta\lambda} \cong 2.3 \cdot 10^{-3} \; m \qquad \text{(Equation 3)}$$

This requirement could be fulfilled with for example a $LiNbO_3$ waveguide or a birefringent fiber as the polarization translator 20.

In a $LiNbO_3$ based polarization transformer 20, a Ti diffused waveguide can be implemented perpendicular to the c-axis (optical axis) of the $LiNbO_3$ crystal (typically selected: x- or y-cut). In this configuration, the waveguide 20 has a high birefringence of $\Delta n \approx 0.079$ with a beat length $L_B$ of the two propagating modes of:

$$L_B = \frac{2\pi}{\lambda} \cdot \Delta n \approx 21 \ \mu m \quad \text{(Equation 4)}$$

around $\lambda=1.55 \ \mu m$. Therefore the requirement mentioned in Equation 3 can be fulfilled with a LiNbO$_3$ waveguide 20 of a length of about 3 cm.

A polarization transformer 20 based on Polarization Maintaining Fiber (PMF) has a typical birefringence of about $10^{-3}$. As this is much lower than in LiNbO$_3$, a much longer length is required: 2.25 m. By increasing the length even further, a higher spectral resolution can be achieved. However, typical DWDM component test applications would require a spectral resolution of the PDL and PMD measurement around 1 . . . 3 pm. Therefore a PMF fiber length of more than 1000 m would be required, which might not be applicable for some applications e.g. for price, volume and possibly stability reasons.

In a further preferred implementation, an 'artificial birefringent device' 200 is used as polarization transformer 20 creating enough delay between the two propagating polarization modes for very high spectral resolution. The incoming (linearly polarized) light is split up in the artificial birefringent device 200 and guided along two different paths having different path lengths with a length difference $\Delta L$. The artificial birefringent device 200 further provides the light returning from the two paths with orthogonal states of polarization. This can be done e.g. by splitting up the incoming light polarization dependent or by changing the state of polarization at least in one of the paths. After recombining the light returning from both paths, the state of polarization of the combined signal depends on the wavelength (or more accurately the frequency) of the optical signal in a deterministic, periodic way. By adjusting the length difference $\Delta L$ the periodicity can be broadly varied.

Figure 3:
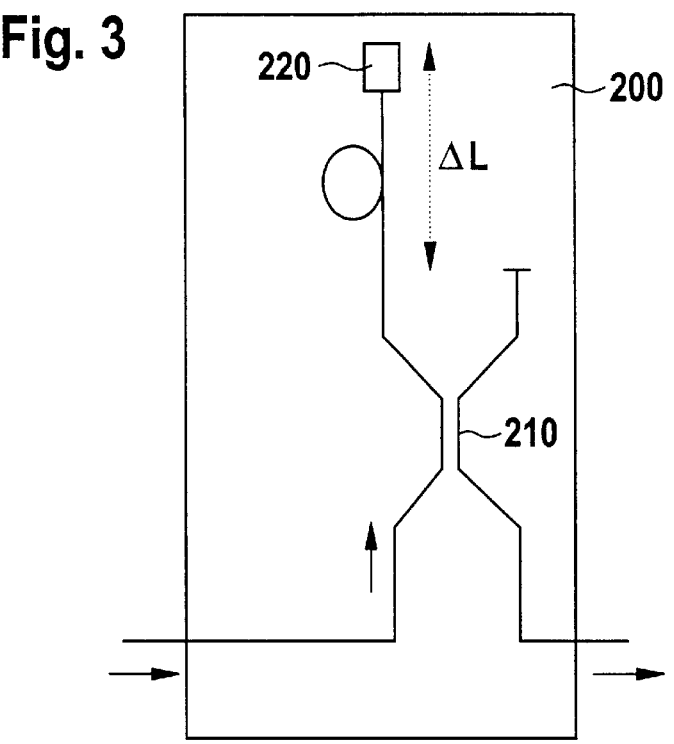
FIGS. 3 and 4 show embodiments of the polarization translator.

FIG. 3 shows a first embodiment of the artificial birefringent device 200. The incoming (linearly polarized) light is split up by a beam splitter or fiber coupler 210 and guided along the two different paths. One (typically short) path returns the signal with its original polarization. A second path, which has a geometric length difference of $\Delta L$, returns the signal in its orthogonal state of polarization, e.g. by providing a Faraday Mirror 220. After recombining the light of the first and the second path, the state of polarization of the combined signal depends on the wavelength of the optical signal.

Figure 4:
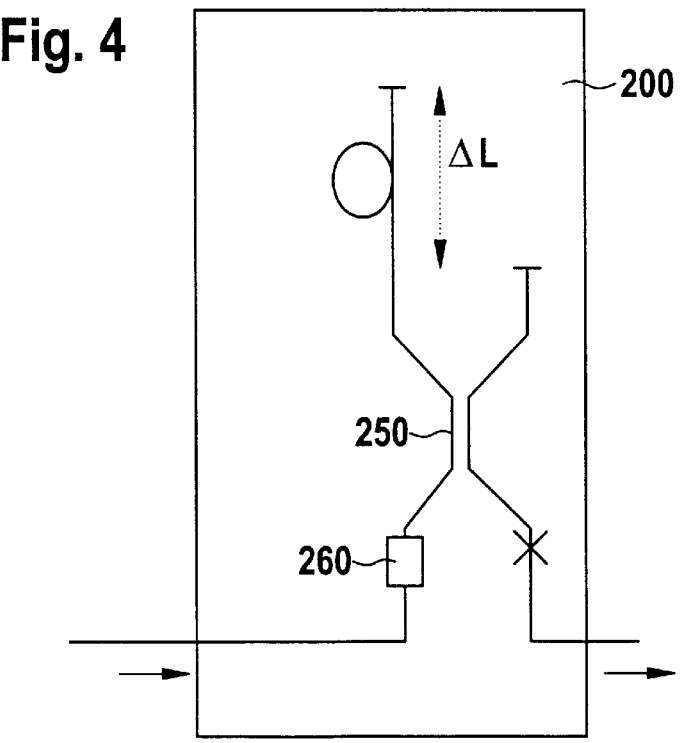

FIG. 4 shows a further embodiment of an artificial birefringent device 200, preferably made of PMF components. The incoming (linearly polarized) light is split up by a polarization dependent beam splitter 250 into light beams having orthogonal states of polarization, guided along the two different paths with the length difference of $\Delta L$, and recombined with the still orthogonal states of polarization. The state of polarization of the combined signal again depends on the wavelength of the optical signal. In order to provide both paths with substantially the same optical powers, a polarizer 260 might be inserted before the polarization dependent beam splitter 250 in order to polarize the incoming light to 45° with respect to polarization states provided by the polarization dependent beam splitter 250.

The artificial birefringent device 200 allows creating an almost arbitrarily selectable delay difference between two signal fractions. The delay difference is defined by the length difference of the fibers $\Delta L$. For this setup Equation 2 changes to:

$$\Delta \lambda \approx \frac{\Delta \alpha_1 \cdot \lambda^2}{2\pi \cdot n \cdot \Delta L} \quad \text{(Equation 5)}$$

where n represents the refractive index of the fiber. As an example, getting a PDL or PMD measurement resolution of 1 pm can be achieved by a length difference $\Delta L=1.5$ m.

What is claimed is:

1. A system for measuring a polarization dependent parameter of an optical device under test—DUT—, comprising:
   an optical source adapted for providing an optical stimulus signal at variable wavelengths,
   a polarization translator being adapted for translating the polarization state of the optical stimulus signal applied from the optical source at its input to its output in a deterministic way dependent on the wavelength of the optical stimulus signal,
   a receiving unit adapted for receiving an optical response signal from the DUT to the applied optical stimulus signal, and
   an analyzing unit adapted for analyzing received optical response signals for different wavelengths for determining values of the polarization dependent parameter of the DUT.

2. The system of claim 1, wherein the polarization translator provides the translation of the polarization dependent on the wavelength by using birefringent properties.

3. The system of claim 1, wherein the optical source is adapted to provide a variation of the wavelength over the time, and the polarization translator is adapted to provide a variation of the polarization over the time in accordance with the variation of the wavelength over the time provided by the optical source.

4. the system of claim 1, wherein the polarization dependent parameter is one of polarization dependent loss, polarization dependent group delay, differential group delay, or polarziation mode diepersion.

5. A method for measuring a polarization dependent parameter of an optical device under test—DUT—, comprising:
   providing an optical stimulus signal at variable wavelengths,
   providing a polarization translator for translating the polarization state of the optical stimulus signal in a deterministic way dependent on the wavelength of the optical stimulus signal,
   receiving an optical response signal from the DUT to the applied optical stimulus signal, and
   analyzing received optical response signals for different wavelengths for determining values of the polarization dependent parameter of the DUT.

6. The method of claim 5, wherein:
   providing an optical stimulus signal at variable wavelengths includes providing the optical stimulus signal with a variation of the wavelength over the time, and
   providing a polarization translator includes varying the polarization state of the optical stimulus signal over the time in accordance with the variation of the wavelength over the time provided by providing an optical stimulus signal at variable wavelengths.

7. The method of claim 5, wherein providing an optical stimulus signal at variable wavelengths includes varying the wavelength of the optical stimulus signal in a way that it does not hit a Principle State of the Polarization of the polarization translator, so that the output signal of the polarization translator will follow a trajectory on the Poincare Sphere in a deterministic way.

8. The method of claim 5, wherein analyzing received optical response signals for different wavelengths includes analyzing several measurement points measurement points defined by the wavelength and the polarization state together for determining one value of the polarization dependent parameter of the DUT.

9. The method of claim 8, wherein the wavelength range for such measurement points to be analyzed together is selected that the one value of the polarization dependent parameter of the DUT can be considered as substantially constant in that wavelength range.

10. The method of claim 5, wherein analyzing received optical response signals for different wavelength includes executing at least one of the algorithms chosen from the following group: interpolation of neighboring measurement points, combing four measurement points using the Mueller Matrix analysis, or combing two measurement points using the Jones Matrix analysis.

11. The method of claim 5, wherein the polarization dependent parameter is one of polarization dependent loss, polarization dependent group delay, differential group delay, or polarization mode dispersion.

12. A software program or product for executing a method for measuring a polarization dependent parameter of an optical device under test —DUT—, when run on a data processing system such as a computer, said method comprising:

providing an optical stimulus signal at variable wavelengths, providing a polarization translator for translating the polarization state of the optical stimulus signal in a deterministic way dependent on the wavelength of the optical stimulus signal, receiving an optical response signal from the DUT to the applied optical stimulus signal, and analyzing received optical response signals for different wavelengths for determining values of the polarization dependent parameter of the DUT.

* * * * *